United States Patent
Kraus

(10) Patent No.: US 10,034,433 B2
(45) Date of Patent: Jul. 31, 2018

(54) BALE ORIENTATION CONTROL SYSTEM AND METHOD FOR AGRICULTURAL ROUND BALER

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 1011 days.

(21) Appl. No.: 14/468,163

(22) Filed: Aug. 25, 2014

(65) Prior Publication Data
US 2016/0050851 A1 Feb. 25, 2016

(51) Int. Cl.
*A01F 15/07* (2006.01)
*A01F 15/08* (2006.01)

(52) U.S. Cl.
CPC .......... *A01F 15/0883* (2013.01); *A01F 15/07* (2013.01); *A01F 15/0715* (2013.01)

(58) Field of Classification Search
CPC .. A04F 15/0883; A04F 15/0875; A04F 15/07; A04F 15/071; A04F 15/0715; A04F 2015/075; A04F 2015/076; A04F 2015/077; A04F 2015/078; A04F 2015/0795; A04F 2015/142; A04F 2015/0725; B65B 11/008; B65B 25/14; A01F 15/0883; A01F 15/0875; A01F 15/07; A01F 15/071; A01F 15/0715; A01F 2015/075; A01F 2015/076; A01F 2015/077; A01F 2015/078; A01F 2015/0795; A01F 2015/142; A01F 2015/0725

USPC .............. 100/87, 88; 56/341; 58/587, 588; 53/587, 588
See application file for complete search history.

(56) References Cited

U.S. PATENT DOCUMENTS

| | | | |
|---|---|---|---|
| 7,093,406 B2 | 8/2006 | Anstey et al. | |
| 7,472,649 B1* | 1/2009 | Derscheid | A01F 15/0883 100/7 |
| 7,625,332 B2 | 12/2009 | Mass et al. | |
| 7,636,987 B2 | 12/2009 | Derscheid et al. | |
| 7,954,633 B2 | 6/2011 | Anstey et al. | |
| 2007/0175198 A1* | 8/2007 | Viaud | A01F 15/0833 56/341 |
| 2009/0107102 A1* | 4/2009 | Biziorek | A01F 15/0715 56/341 |
| 2010/0236427 A1* | 9/2010 | Derscheid | A01F 15/0715 100/5 |

(Continued)

OTHER PUBLICATIONS

John Deere B-Wrap Brochure.

*Primary Examiner* — Jimmy T Nguyen
(74) *Attorney, Agent, or Firm* — Klintworth & Rozenblat IP LLP

(57) ABSTRACT

A system and method are provided for controlling the orientation of a bale discharged from an agricultural round baler according to the position of the discharge gate. When the bale reaches the desired orientation inside the bale forming chamber, such as when a segment or the cut end of the bale wrap is within a desired angular position, an electro-hydraulic control valve is activated, manually or automatically, to actuate the gate cylinders to open the gate, thereby stopping bale rotation and discharging the bale in the desired orientation.

11 Claims, 2 Drawing Sheets

(56) References Cited

U.S. PATENT DOCUMENTS

2011/0023732 A1\* 2/2011 Herron .................. A01D 43/06
100/40

\* cited by examiner

BALE ORIENTATION CONTROL SYSTEM AND METHOD FOR AGRICULTURAL ROUND BALER

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

The disclosure relates generally to agricultural balers. More particularly, the disclosure relates to agricultural balers that produce cylindrical bales, commonly referred to as round balers. Specifically, the disclosure relates to round balers equipped with systems to control the orientation of each bale prior to discharge from the baler.

BACKGROUND OF THE DISCLOSURE

Agricultural round balers collect and process cut crop material into to tightly wound cylindrical bales. The spiral wound cylindrical bales are typically tightly wrapped with a twine, netting or other wrap material to maintain their cylindrical shape after being discharged from the baler. For various reasons, it may be beneficial to discharge the bales in a particular orientation. For example, orienting the bales in a particular manner may assist in retaining the wrap material on the bales, or may allow for a certain side of the bale to be in either a ground-contacting or sun-exposed position.

One known problem with round bales is that when the bales are not oriented properly the wrap material (e.g., net or twine) may hang down from the bales, and may get caught in the tires of the tractor when they are transported. When looking at the bale end face with the wrap wrapped around the bale in a clockwise fashion, for example, it will be seen that if the end of the wrap is located between about the 7:00 and 11:00 o'clock positions, it is possible for the end of the wrap to become loose from the bale and fall down toward the ground. If, however, the end of the wrap is located, for example, between about the 1:00-5:00 o'clock positions it is very unlikely that if the end became loose, gravity would tend to pull the wrap downward keeping it in contact with the bale.

One known system has been developed to orient the bales within the baler, which senses when the actuator that is used to cut the wrap has completed the cutting process, then it measures the number of rotations of the bale inside the bale forming chamber and, when the end of the wrap is in the desired location inside the bale forming chamber, the system disengages a clutch in the main driveline to stop the rotation of the bale. After the clutch has been disengaged, the gate is opened by the operator to discharge the bale. However, such a system, particularly including a clutch arrangement, significantly adds to the complexity and cost of the machine.

SUMMARY OF THE DISCLOSURE

A bale orientation system and control method for an agricultural round baler monitor the orientation of the bale after it is formed and, when the bale is in a desired orientation, stop the bale from rotating by opening the gate, thereby discharging the bale in the desired orientation. As one example, the desired orientation may correspond to an angular position of a cut end of wrap material wrapped around the bale which reduces the tendency of the wrap form unraveling from the bale.

In one aspect, the disclosure provides a method for discharging a bale from an agricultural round baler while in a desired orientation. The baler has a gate and a gate actuation cylinder. The method includes determining, by the one or more controllers, whether the bale within a bale forming chamber of the baler is in the desired orientation for discharge from the baler; and actuating the gate actuation cylinder to open the gate. The bale is discharged from the baler when the gate is opened.

Another aspect of the disclosure provides an agricultural round baler configured for producing cylindrical bales. The baler has a bale forming chamber, a plurality of moving bale forming elements, a wrapping assembly for wrapping a bale with wrapping material, a gate, a gate actuation cylinder connected with a source of hydraulic pressure, and one or more controllers. The baler also includes a hydraulic system in communication with the gate actuation cylinder, a control valve and the source of hydraulic pressure. The one or more controllers are in communication with bale sensors, such as a gate position sensor that indicates whether the gate is opened or closed and a bale orientation sensor that indicates an orientation of a bale formed within the bale forming chamber. The one or more controllers may also be in communication with the control valve. When the bale is at the desired orientation according to the bale orientation sensor, the one or more controllers are configured to either actuate the control valve, or provide an operator indicator for manual activation of the control valve, or both. Actuation of the control valve controls a flow of hydraulic fluid between the source of hydraulic pressure and the gate actuation cylinder to open the gate, and thereby discharge the bale from the baler.

The various aspects of the disclosure are described in detail below in one or more example embodiments with reference to the accompanying drawings.

DETAILED DESCRIPTION

Figure 1:
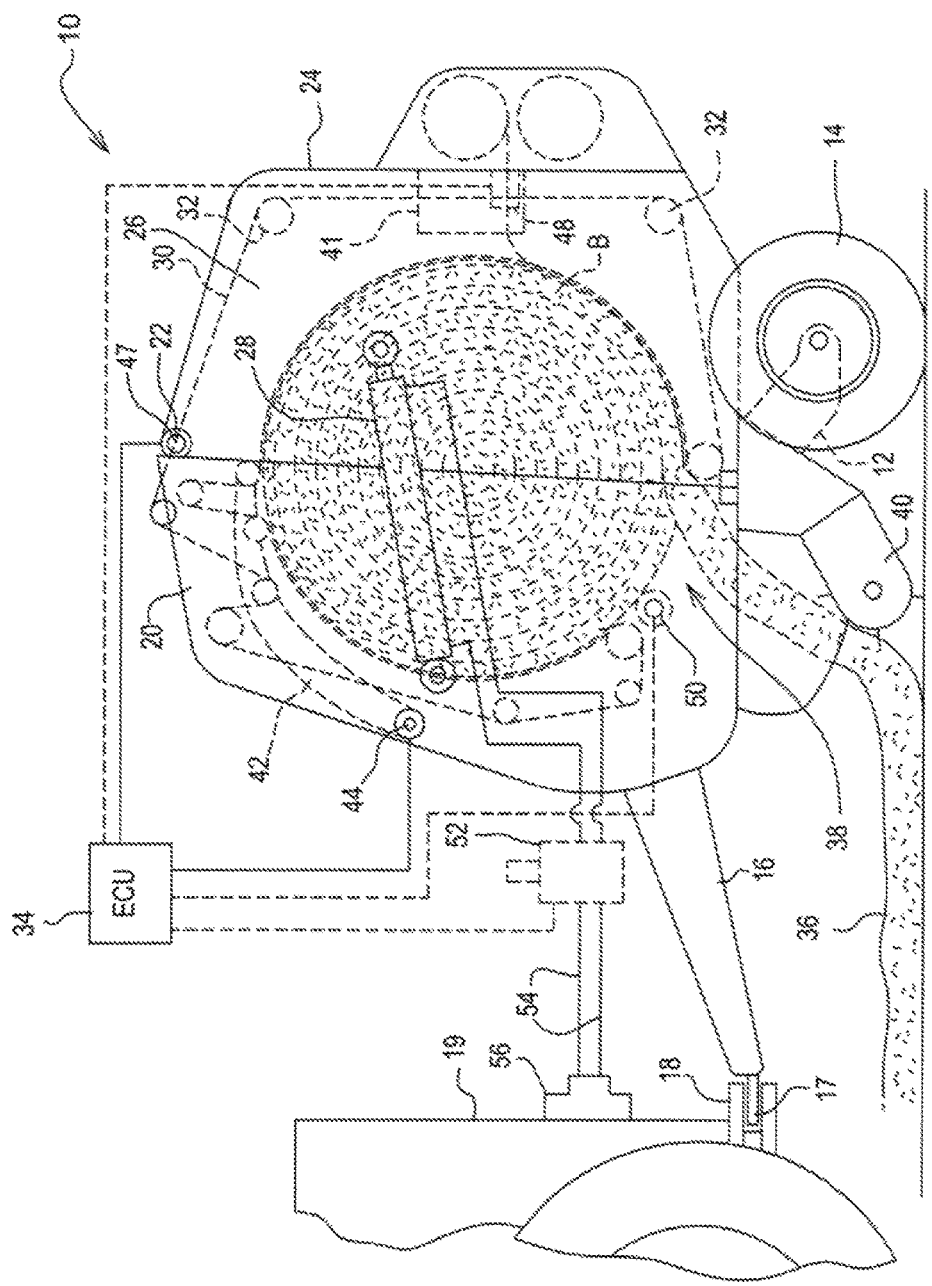
FIG. 1 is a partially schematic side view of an example agricultural round baler having a bale orientation control system according to this disclosure.

The following describes one or more example embodiments of the disclosed agricultural round baler and bale orientation system and method, as shown in the accompanying figures of the drawings described briefly above. Various modifications to the example embodiments may be contemplated by one of skill in the art, including implementation of the disclosed method through a special-purpose computing system employing one or more processor devices and memory architectures.

As used herein, "wrap material" may indicate one of various types of materials utilized to hold bales of compressed crop or other plant matter together or to otherwise maintain the integrity (structural or otherwise) of the bales. Wrap material may include, for example, twine or similar material, net wrap, plastic or other sheeting (i.e., "sheet wrap"), banding, straps, and so on. In certain instances, wrap material may be provided in spools or rolls, including spools of twine, rolls of net wrap, rolls of plastic sheeting, and so on.

Also as used herein, "wrapping" a bale may include application of wrap material to a bale in various ways in order to hold the bale together or otherwise maintain the integrity of the bale. For example, a bale may be wrapped with twine by looping the twine around the bale and, in certain instances, knotting the loops. Likewise, a bale may be wrapped with net or sheet wrap by applying the net or sheet over outer portions of the bale. In certain instances, wrapping a bale may also include securing wrap material in place on the bale. For example, to secure wrap material to a bale, the wrap material may be looped over itself, knotted or tied, heat welded or sealed, sealed through vibration, shrunk in place, expanded, secured with clasps, and so on. Conventional balers may wrap a bale with loops of twine as the bale is formed in the bale forming chamber. Once the bale is fully formed, knotters may knot the twine loops to secure the twine around the bale. Knotters may be distributed laterally across the width of the bale forming chamber, such that each knotter ties a single loop of twine around a formed bale.

Additionally, as used herein "orientation" may indicate a positioning of a cylindrical or round bale from the perspective of one of its end faces. Thus, orientation refers to the angular position that a point on the outer periphery of the round bale takes about a central axis extending through the bale between its end faces. Furthermore, as used herein, "desired orientation" may indicate a particular angular position of the bale about its central axis. It may also refer to a range of angular positions about its axis. The angular position, or range of angles, desired may be based on one or more factors, including factors related to the characteristics of the bale itself, the method and location of deployment from the baler, and characteristics of the wrap material on the bale. For example, the desired orientation may be selected according to the angular position of a free, or cut, end of the wrap material on the bale. In this case, a desirable orientation of the bale may be an angular position in which the free end of the wrap material is located so as to minimize the tendency to unravel should the end separate from the bale. For example, an angular position of the bale that locates the end of the wrap material within an upper quadrant of the bale may be desired. If the wrap is wound on the bale in a clockwise direction, then it may be desired that the end falls within the upper right quadrant (upper left if wound counter-clockwise). The desired orientation may also be any angular position within a certain number of degrees or clock positions. By way of example only, a desired orientation of a bale wrapped in a clockwise direction may be between the 1:00-5:00 o'clock positions (between 7:00 and 11:00 o'clock positions if wound counter-clockwise).

In one aspect, a system and method are provided that opens the gate of an agricultural round baler when the wrap (e.g., net or twice) is in the desired position to stop the bale from rotating. This may be carried out by an electro-hydraulic control valve located in the hydraulic system of the baler itself, or in a hydraulic system of another vehicle or implement that is in communication with the hydraulic system of the baler. For example, the control valve may be a selective control valve (SCV) that is physically located on a tractor or other vehicle that tows the baler. Alternatively, the control valve may be part of the baler hydraulic system, such as placed in the gate hydraulic line. Thus, the control valve can be located remotely or onboard the baler provided it is operable to interrupt flow from the hydraulic fluid source to the gate actuators.

When the bale reaches the desired orientation inside the bale forming chamber, the electro-hydraulic servo valve is activated and hydraulic fluid (pressure) is allowed to flow to the hydraulic cylinder or cylinders that open the gate. If an attempt is made to open the gate when the bale is not in the correct orientation inside the bale forming chamber, the de-energized, closed electro-hydraulic servo-valve prevents the gate from opening until the end of the wrap comes around to the proper angular position at which time the valve is activated to open the gate.

In some previous systems a clutch was used to stop the rolls and belts when the bale was oriented correctly. This clutch can be eliminated by simply opening the gate at the right moment inasmuch as opening the gate dislodges the bale from the moving rolls and allows the belts to go slack inhibiting further rotation of the bale. As noted, this may be accomplished by an SCV onboard the towing vehicle or by an additional electro-hydraulic valve in the line between the gate cylinders and the (SCV) which can selectively interrupt the flow of hydraulic fluid to the gate cylinders preventing the gate from opening until the bale is in the correct orientation. A gate position sensor may signal an electronic controller when the gate has completed the discharge of the bale so that the gate can be closed, at which time the electro-hydraulic valve returns automatically, or is actuated, to once again interrupt flow to the gate cylinders until such time that the next bale is complete and in the correct orientation for discharge. One advantage of this system is that can it replace a clutch assembly with a relatively inexpensive electro-hydraulic valve.

With reference to the FIG. 1, one example agricultural round baler 10 will now be described. It will be understood, however, that the improvements disclosed herein may be utilized with respect to a variety of balers and baler types.

The agricultural round baler 10 may have a main frame 12 supported on a pair of ground wheels 14. A draft tongue 16 may have a rear end joined to the frame 12 and a forward end defined by a clevis arrangement 17 adapted for being coupled to the drawbar 18 of a tractor 19 (partially shown). A pair of upright side walls 20 may be fixed to the main frame 12 to define forward regions of opposite side walls of a bale forming (or baling) chamber. Mounted for pivoting vertically about a horizontal pivot arrangement 22 located at an upper rear location of the side walls 20 is a discharge gate 24 including opposite upright side walls 26, which define opposite sides of a rear region of the bale forming chamber. A gate cylinder arrangement 28 may be coupled between the main frame 12 and the opposite side walls 26 of the discharge gate 24 and is selectively operable for moving the discharge gate 24 between a lowered baling position and an opened discharge position. The baler 10 as shown is of a variable size chamber design and thus comprises a plurality of longitudinally extending side-by-side belts 30 supported on a plurality of rollers 32 (only a few of which are shown). A bale forming chamber is defined by the side walls 20, 26, the rollers 32 and belts 30. It is understood that while one cylinder is shown, two or more cylinders may be used to open and close the discharge gate 24. It is also understood that other arrangements may be utilized to form the bale.

The baler 10 may also include one or more controllers, such as electronic controller unit (ECU) 34. The controllers may be configured as computing devices with associated processor devices and memory architectures, as hydraulic, electrical or electro-hydraulic controllers, or otherwise. As such, the controllers may be configured to execute various computational and control functionality with respect to the baler 10 (and other machinery). It will be understood that the controllers may be placed in various locations on the baler 10 or on remote locations (e.g., on a towing vehicle such as tractor 19, at a remotely located control station (not shown), and so on). The controllers may be in electronic, hydraulic, or other communication with various other systems or devices of the baler 10 (or machinery). For example, the controllers may be in electronic or hydraulic communication with various actuators, sensors, and other devices within (or outside of) the baler 10, including various devices associated with the bale forming chamber and related mechanisms. The controllers may communicate with other systems or devices (including other controllers) in various known ways, including via a CAN bus (not shown) of the baler 10 or a towing vehicle (e.g., tractor 19), wirelessly, hydraulically, or otherwise. More specifically, ECU 34 is configured to receive signals from various sensors on the baler 10, for example, to determine bale diameter, bale shape, bale weight, etc. and for initiating various baler functions such as the tying or wrapping cycle, bale ejection, opening the gate etc.

In its general operation the baler 10 is drawn through a field by the tractor 19 attached to the tongue 16. Crop material 36 is fed into a crop inlet 38 of the bale forming chamber from a windrow of crop on the ground by a pickup 40. In the baler 10, the crop material 36 is rolled in spiral fashion into a cylindrical bale B.

Upon completion, the bale B is wrapped, such as with twine, net or other appropriate wrapping material, via a wrap feed and cut-off system 41 (not shown in detail) and is discharged by actuation of gate cylinders 28 that open gate 24 permitting the completed bale B to be discharged from the baler 10 onto the ground. As mentioned previously, the baler 10 illustrated is a variable chamber design wherein crop is rolled up in a spiral fashion in a nip formed between oppositely moving adjacent loops of belts 30. The space between adjacent loops of belts 30 grows as the forming bale B grows larger. Accordingly, a belt tensioning device 42 may be provided to take up slack in the belts 30 as needed. Thus, the position of the tensioning device 42, at any given time, is an indication of the size of the bale B at that time. A bale diameter sensor 44, such as in the form of a potentiometer, may be affixed to the pivot point of the tensioning device 42 and thus provide an electrical signal correlating with bale diameter to the ECU 34. The ECU 34, via appropriate logic, can then translate the signal into meaningful bale size data that can be communicated to an operator by way of an appropriate display device (not shown). In addition to providing an indication of bale size to the operator, the ECU 34 can be adapted to utilize bale diameter data for other purposes such as triggering a wrapping cycle, opening the discharge gate, initiating bale discharge, or to control the application of preservative to the bale. While the baler illustrated is an example of a variable chamber baler, it should be understood that the baler could be of a fixed chamber or other design.

In certain embodiments in which twine is used as the wrapping material, a number of knotters (not shown) may be provided. Twine may be looped around a bale in the bale forming chamber and then tied with the knotters to secure the twine on the bale. In certain embodiments, a wrapping device other than twine knotters may be provided. For example, a hoop or other device may be utilized to loop wrap material (e.g., from rolls of wrap material) around a bale. Rolls of wrap material and associated wrapping devices (or another similar arrangement) may be provided. The rolls of wrap material may be supported on (or about) the baler 10 in various ways, and various associated devices (not shown) may loop material from the rolls around bales in order to wrap the bales.

A gate position sensor 47 may be provided to determine whether the gate is opened or closed. The gate position sensor 47 is in communication with the ECU 34. A wrap feed and cut-off system position sensor 48 may also be provided to determine when the wrap has been fed into the bale forming chamber and has completed wrapping the bale by, for example, sensing the actuation of a cut-off means. The wrap feed and cut-off system position sensor 48 is also in communication with the ECU 34. A bale orientation sensor 50, also in communication with the ECU 34, may also be provided to determine the orientation of the bale within the bale forming chamber. The bale orientation sensor 50 could, for example, monitor the number of rotations of the bale during and after the wrap feeding and cut-off cycle. This count of rotations can then be correlated in the ECU 34 with the bale diameter to determine the orientation of the bale B within the bale forming chamber.

Additionally one or more electro-hydraulic control valves 52 (one shown) may be a part of the baler hydraulic system and interposed in the hydraulic lines 54 connecting the gate cylinders 28 with an SCV 56 of the tractor 19. The electro-hydraulic control valve 52 may be electrically activated according to signals from the ECU 34 and may be configured to control the flow of hydraulic fluid between the SCV 56 and the gate cylinders 28. It should be re-emphasized here that while the control valve 52 is shown and described herein onboard the baler 10 for controlling the gate cylinders 28, one or more remotely mounted control valves that are a part of another hydraulic system, but in fluid communication with the hydraulic system of the baler 10, may be employed to carry out the disclosed bale orientation system and method. As one non-limiting example, the SCV 56 mounted on, and part of the hydraulic system of, the tractor 19, may be used, since the tractor 19 and baler 10 hydraulic systems should be understood to be coupled together in fluid communication with one another, as denoted by hydraulic lines 52 in FIG. 1.

Furthermore, it should be understood that while the gate actuation is described herein as being done automatically by the ECU 34, or various other controllers onboard, or remote from (e.g., on the tractor 19), manual gate actuation is also contemplated. By way of example, the operator of the tractor 19 may activate the SCV 56 via any suitable control lever or interface to disrupt or allow hydraulic flow to the gate cylinders 28 to thereby close and open the gate 24. To better ensure proper orienting of the bale B for discharge, the various sensors and controllers may be employed to give the operator a feedback cue (e.g., tactile, visual or audible indicator) that the bale B is about to reach the desired orientation for discharge. The ECU 34, or other controllers, may initiate a steady or progressive audible tone, for example, within the tractor cabin to notify the operator of the proper time to actuate the SCV 56, and thereby open the gate 24 to stop bale rotation and discharge the bale B.

Figure 2:
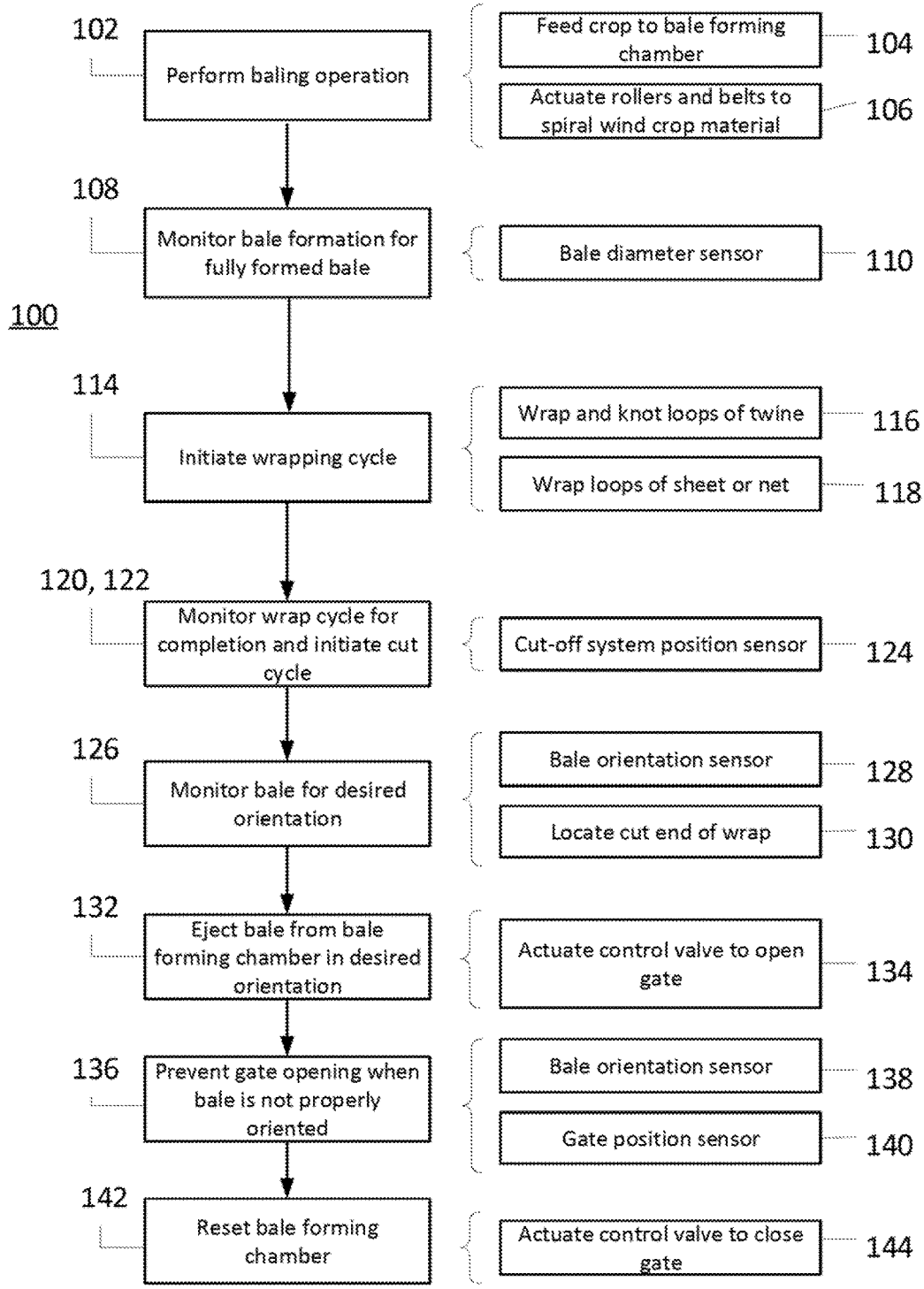
FIG. 2 is a flow diagram illustrating an example control method for the bale orientation control system.

Various bale orientation control functionality, including various operations described above, may be executed as part of a bale orientation control (BOC) method, which may be controlled, at least in part, by a controller of various configurations (e.g., ECU 34). Referring also to FIG. 2, for example, ECU 34 may assist in execution of various operations of a BOC method 100.

Also referring to FIG. 2, in operation the method may include performing 102 the baling operation in which crop material is fed 104 from the crop inlet 38 to the bale forming chamber where it is spiral wound 106 by the various belts 30 and rollers 32 of the baler 10. The ECU 34, or various other controllers, may monitor 108 the bale formation for indication of that a fully formed or sized bale B has been completed using input 110 from the bale diameter sensor 44, which may be providing feedback signals of the position of the tensioning device 42, as noted above. Upon detection of the bale being properly sized, the ECU 34, or various other controllers, may initiate 114 a wrapping cycle in which twine is wrapped and knotted 116, or sheets or net is wrapped 118, about the bale B to bind the wound crop material within the bale forming chamber. The wrap feed and cut-off system (not shown) may then execute a cut cycle 120 to sever the wrap material wound about the bale B from the supply wrap material on the baler 10.

The BOC method 100 may then monitor 122 the wrapping cycle for completion. For example, the wrap feed and cut-off system position sensor 48 may sense 124 when an actuator that is used to cut the wrap (e.g., net or twine) has completed the cutting process. In addition, the orientation of the bale B inside the bale forming chamber may be monitored 126, for example, the orientation of the bale B may be sensed 128 by the bale orientation sensor 50 and the number of rotations of the bale B may be counted or otherwise followed to track 130 the location of the cut end of the wrap. The rotations and/or the sensed orientation may be correlated in the ECU 34 with the bale diameter to determine when the end of the wrap is in the desired angular location inside the bale forming chamber. When the bale B is in the desired orientation for ejection, it may be discharged 132 from the baler. For example, the ECU 34, or various other controllers, may actuate 134 the electro-hydraulic control valve 52 which allows the gate cylinders 28 to begin opening the gate 24. This in turn stops the further rotation of the bale B inasmuch as the bale B begins to dislodge from the rolls 32 and the belts 30 become slack.

During the bale forming process the electro-hydraulic valve 52 is actuated by the ECU 34, or other various controllers, to prevent flow of hydraulic fluid between the SCV 56 and the gate cylinders 28, and thus prevent the gate 24 from being opened fully. The BOC method 100 may also provide that if the operator commands the opening of the gate 24 before the bale B is oriented correctly, then the gate 24 the electro-hydraulic valve 54 continues to interrupt 136 flow to the gate cylinders 28 until such time that the bale B is oriented correctly. When the bale is oriented correctly to be discharged, for example based on input 138 from the bale orientation sensor, the electro-hydraulic valve 54 is actuated to allow flow of hydraulic fluid to the gate cylinders 28 until such time that the ECU 34, or other various controllers, receives 140 a signal from the gate position sensor 47 that the gate 24 has fully closed. At that time the electro-hydraulic valve is actuated 140 to once again interrupt flow to the gate cylinder until such time that the next bale is complete and in the desired orientation for discharge. With the bale B ejected, the bale forming chamber may then be reset 142, and the gate closed 144, so that the baling cycle can be re-commenced.

In view of the foregoing it can be seen that bale orientation control can be accomplished by replacing a costly clutch with a less expensive electro-hydraulic valve to allow the rotation of the bale to be stopped by opening the gate for the bale discharge process.

As will be appreciated by one skilled in the art, certain aspects of the disclosed subject matter may be embodied as a method, system, or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An agricultural round baler configured for producing cylindrical bales, the baler having a bale forming chamber, a plurality of moving bale forming elements, a wrapping assembly for wrapping a bale with wrapping material, a gate, a gate actuation cylinder connected with a source of hydraulic pressure, and one or more controllers, the baler comprising:
a hydraulic system communicating with the gate actuation cylinder, a control valve and the source of hydraulic pressure;
a gate position sensor in communication with the one or more controllers to indicate whether the gate is opened or closed; and
a bale orientation sensor in communication with the one or more controllers to indicate an orientation of a bale formed within the bale forming chamber;
wherein, when the bale is in a desired orientation according to the bale orientation sensor, the one or more controllers are configured to at least one of:
actuate the control valve; and
provide an operator indicator for manual activation of the control valve;
wherein actuation of the control valve controls a flow of hydraulic fluid between the source of hydraulic pressure and the gate actuation cylinder to open the gate and thereby discharge the bale from the baler.

2. The agricultural round baler of claim 1, wherein the one or more controllers are configured to actuate the control valve to prevent flow of hydraulic fluid from the source of hydraulic pressure to the gate actuation cylinder when the gate position sensor and bale orientation sensor indicate that the gate is closed and the bale is not in the desired orientation, respectively.

3. The agricultural round baler of claim 2, further including a bale diameter sensor;
wherein the one or more controllers are configured to monitor the bale diameter sensor and activate the wrapping assembly to complete a wrapping cycle when the bale diameter sensor indicates that the bale has been formed in the bale forming chamber to wrap the bale with the wrapping material.

4. The agricultural round baler of claim 3, further including a cut-off system to cut the wrapping material and a cut-off system position sensor;
wherein the one or more controllers are configured to monitor the cut-off system position sensor and activate the cut-off system to complete a cut cycle when the cut-off system position sensor indicates that the wrapping cycle has been completed, the cut cycle leaving a cut end of the wrapping material on the bale.

5. The agricultural round baler of claim 4, wherein the one or more controllers monitor the bale orientation sensor to determine an orientation of the bale with respect to the cut end of the wrapping material.

6. The agricultural round baler of claim 5, wherein the bale is formed in a spiral fashion inside the bale forming chamber.

7. The agricultural round baler of claim 6, wherein the orientation of the bale is compared to the desired orientation, and wherein the desired orientation is based on an angular position of the cut end of the wrapping material.

8. The agricultural round baler of claim 1, wherein the gate is hinged to an upper rear area of the baler.

9. The agricultural round baler of claim 8, wherein the gate has side walls that in part define the bale forming chamber of the baler.

10. The agricultural round baler of claim 9, wherein the bale forming chamber is a variable size chamber in which the bale is formed in a spiral fashion.

11. The agricultural round baler of claim 10, further including a plurality of belts supported by a plurality of rollers at least partially contained within the gate, and wherein the belts contact and, at least in part, wrap around crop material when forming the bale.

* * * * *